UNITED STATES PATENT OFFICE.

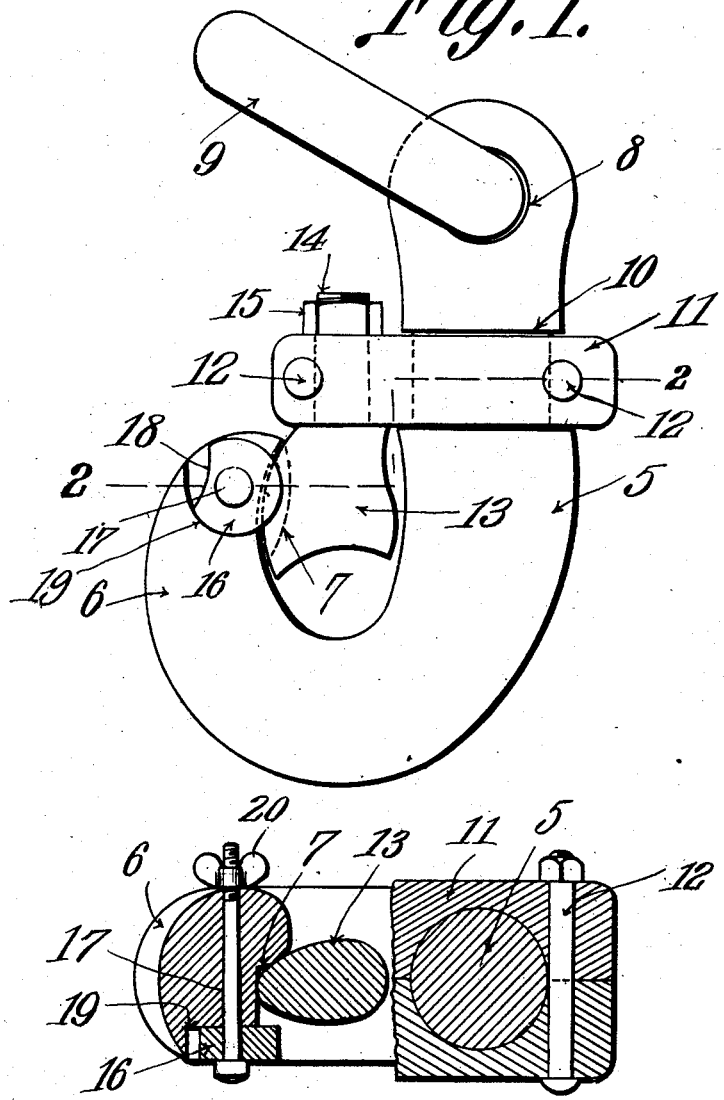

LOUIS SLONE DENISON, OF KELSO, WASHINGTON.

CHOKER-HOOK.

992,759.

Specification of Letters Patent. Patented May 23, 1911.

Application filed June 16, 1910. Serial No. 567,275.

*To all whom it may concern:*

Be it known that I, LOUIS SLONE DENISON, a citizen of the United States, residing at Kelso, in the county of Cowlitz and State of Washington, have invented a new and useful Choker-Hook, of which the following is a specification.

This invention relates to hooks designed more particularly for use in logging and other operations requiring a heavy strong hook, and it is the object of the invention to provide in a hook of this kind, an improved mousing which securely locks the line in the hook, and which can be quickly placed in locking position, as well as in release position.

With these objects in view, the invention consists in a novel construction and arrangement of parts to be hereinafter described and claimed, reference being had to the accompanying drawing, in which, Figure 1 is a side elevation of the hook. Fig. 2 is a horizontal section on the line 2—2 of Fig. 1.

Referring to the drawing, 5 denotes the shank, and 6 the bill of the hook. The inner surface of the bill is formed with a shoulder 7 which is for a purpose to be presently described. The shank is formed with an eye 8 to receive a link 9 to which the chain or line carrying the hook, is connected. Above the plane of the bill of the hook, the shank 5 has a reduced portion 10 forming two shoulders between which is received a collar 11, said collar being in two parts as shown in Fig. 2 so that it may be placed in position on the reduced portion of the shank between the shoulders. The two parts of the collar are secured by bolts or other suitable fastening means 12. The collar projects a short distance from that side of the shank on which the bill of the hook is located, and said projecting end carries a mousing 13 having a stem 14 passing through the collar, and projecting from the top thereof, the projecting end of the stem being screw threaded to receive a nut 15, whereby the mousing is securely fastened to the collar. The collar 11 is sufficiently loose on the shank so that it may be rotated thereon to swing the mousing into the space between the shank and the bill of the hook against the shoulder 7, the mousing entering the space sidewise, and the rotary movement of the collar being on an axis coinciding with the axis of the shank.

For the purpose of preventing the mousing from swinging out of the space between the shank and bill of the hook, there is provided a latch 16 in the form of a turn button mounted near the point of the bill on a bolt 17 carried by the latter. The turn button is dimensioned so as to project into the space between the bill and the shank opposite the shoulder 7, the mousing being received between the shoulder and the projecting portion of the turn button. A portion of the turn button is cut away as indicated at 18, and upon swinging said cut away portion in the direction of the space between the bill and the shank, the projecting portion of the button is withdrawn, after which the mousing may be swung out of the space between the bill and the shank. The turn button seats in a shoulder 19 made in the bill of the hook near its point.

A mousing constructed and arranged as herein described securely locks the line in the hook, and the mousing can also be quickly placed in locking as well as in release position. To place the mousing in locking position, the turn button is swung into inoperative position, and the mousing is swung into the space between the bill and the shank of the hook so as to come against the shoulder 7. The turn button is now swung into locking position, whereupon the mousing is prevented from swinging out of the space between the bill and the shank, it being located between the turn button and the shoulder. To release the mousing it is necessary only to place the turn button in release position, after which the mousing can be swung out of the space between the bill and the shank. Inasmuch as the collar 11 swings on an axis coinciding with the axis of the shank of the hook, the mousing enters the space between the bill and the shank sidewise.

On the bolt 17 is screwed a wing nut 20, which is employed to tighten up the bolt and clamp the turn button in locking position.

What is claimed is:

1. The combination with a hook having a shouldered bill, of a mousing carried by the shank and adapted to be moved into and out of position to close the mouth of the hook, and a latch carried by the bill, and adapted to be extended into the space between the bill and the shank of the hook opposite the aforesaid shoulder, the mousing being received between the shoulder and the latch.

2. The combination with a hook having a shouldered bill, of a mousing, a two-piece support for the mousing rotatably mounted on the shank of the hook, and swinging on an axis coinciding with the axis of said shank, and a rotatable latch carried by the hook, and adapted to be extended into the space between the bill and the shank opposite the shoulder, the mousing being received between said shoulder and latch.

In testimony that I claim the foregoing as my own, I have hereto affixed my signature in the presence of two witnesses.

LOUIS SLONE DENISON.

Witnesses:
WM. C. NELSON,
GEO. F. PLAMONDON.